April 4, 1961 K. L. PARK 2,978,005

APPARATUS FOR WINDING AND MOUNTING INDUCTION COILS

Filed Dec. 29, 1955 4 Sheets-Sheet 1

INVENTOR.
Kenneth L. Park
BY
Donald P. Smith
Attorney

INVENTOR.
Kenneth L. Park
BY
Donald P. Smith
Attorney

April 4, 1961 K. L. PARK 2,978,005

APPARATUS FOR WINDING AND MOUNTING INDUCTION COILS

Filed Dec. 29, 1955 4 Sheets-Sheet 3

INVENTOR.
Kenneth L. Park
BY
Donald P. Smith
Attorney

April 4, 1961 K. L. PARK 2,978,005

APPARATUS FOR WINDING AND MOUNTING INDUCTION COILS

Filed Dec. 29, 1955 4 Sheets-Sheet 4

INVENTOR.
Kenneth L. Park
BY
Donald P. Smith
Attorney

United States Patent Office 2,978,005
Patented Apr. 4, 1961

2,978,005

APPARATUS FOR WINDING AND MOUNTING INDUCTION COILS

Kenneth L. Park, Cheverly, Md., assignor, by mesne assignments, to Illinois Tool Works, Chicago, Ill., a corporation of Illinois Filed Dec. 29, 1955, Ser. No. 556,161
6 Claims. (Cl. 154—1.6)

This invention relates to a new type of induction coil mounting and to a method for mounting the coil; the invention also provides a novel mechanism for performing the mounting method.

When an induction coil is to be wound and mounted on a plate or insulating panel it is the customary practice to wind such coil on a machine and thereafter remove it and use other devices for mounting onto a core or other suitable base. The present invention discloses a novel structure which winds a spiral coil and upon completion of the winding mounts the coil upon a plate held in a spaced plane to receive such coil as will later be more fully explained.

The use to which the invention is well suited is the fabrication of coils in the miniaturization and automatic production of electronic circuits. Developments in the electronic arts has made it mandatory that the methods of fabricating circuits be simplified to effect economies in production. This is the result of the vast complexity of circuitry which has evolved over recent years. One adroit solution to the automation and miniaturization problem is the modular technique wherein a plurality of wafers are arranged in a series of spaced parallel planes and are each provided with kerfs around the periphery to receive conductors which form right angles with the spaced planes. When electronic components are mounted upon these wafers a three dimensional configuration is obtained which has appreciable versatility. As will be appreciated a vacuum tube socket may be carried on the top wafer and the other components of a particular stage may be disposed on the several spaced wafers whereby a module will represent a complete and self-sufficient stage of an electronic circuit and may be used with printed circuit panels to form a circuit. This invention relates in part to the coils carried by such modules.

An object of the invention is to provide a method for winding a coil and pressing the same onto a receiving plate.

Another object of the invention is to provide a method for winding and mounting coils wherein upon completion of the winding operation the act of mounting the coil automatically severs the winding wire strand.

It is a further object of the invention to provide a machine for winding spiral coils and thereafter pressing such coils onto a mounting plate.

It is a still further object of this invention to provide a coil winding and mounting apparatus in which the coil is wound and held in a plane spaced from a mounting plate whereby the pressing of the coil from the winding device acts to mount the coil upon the plate.

A yet still further object of the invention is to provide a novel electrical component wherein a coil is mounted upon insulating member having a series of kerfs formed around the periphery thereof.

In accomplishing the purposes and the above named objects of the invention an important feature is the fact that the mounting plate is held spaced from and in a plane parallel to the coil while the coil is being wound so that upon removal of the coil from the winding agency the same is at once mounted in permanent position.

Further features and objects of the invention will be apparent from the following detailed description and the accompanying drawing in which.

Figure 1:
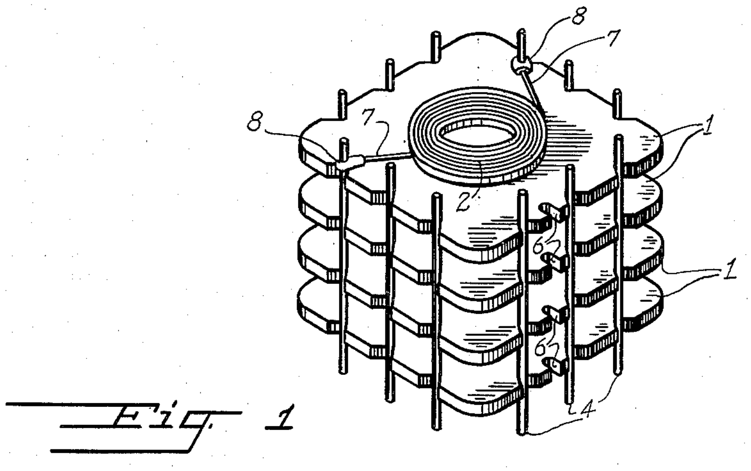
Figure 1 is a perspective view of a module structure showing a coil mounted on a top wafer.
Figure 2:
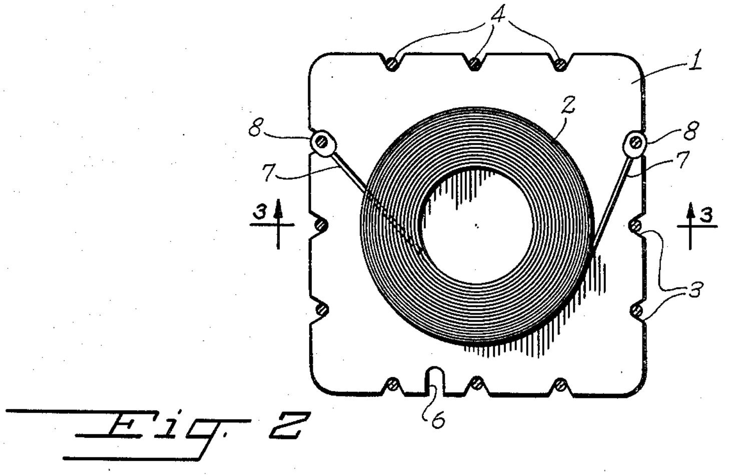
Figure 2 is a top plan view of the module of Figure 1.
Figure 3:
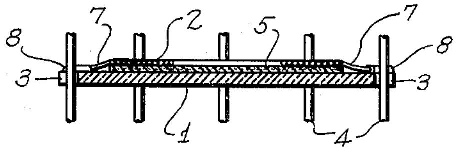
Figure 3 is an elevation in section of the module wafer of Figure 2 taken on the lines 3—3, and looking in the direction of the arrows.

The generic principles of the invention are applicable in a variety of different machine constructions for operation under a variety of different conditions on many materials. The hereafter illustrated embodiment represents only the application of the concept to a specific instance. Referring now to the drawings wherein like reference characters designate like or corresponding parts, reference character 1 designates an insulating planar member having a series of kerfs 3 disposed in the outer periphery thereof to receive conductors 4. A coil 2 so constructed that its radial dimension is substantially greater than its axial dimension lies in a plane on the face of the wafer as shown. An area of adhesive 5 as best seen in Figure 3 serves to join the coil to the wafer. The ends of the coil 7 are brought out to interconnect with the conductors at terminals indicated by reference character 8. An examination of Figure 1 reveals the module as comprising a series of wafers disposed in spaced parallel planes and having kerfs formed to be equally spaced in the periphery thereof to receive conductive risers which form right angles therewith. An orienting notch 6 is used to properly position the several wafers in the machinery depended upon to automatically fabricate the unit. In practice the module is mounted on a panel having printed circuitry thereon and the conductive risers are bent back upon themselves to engage against such printed circuitry thereby connecting the module carrying its components into an external circuit.

Figure 4:
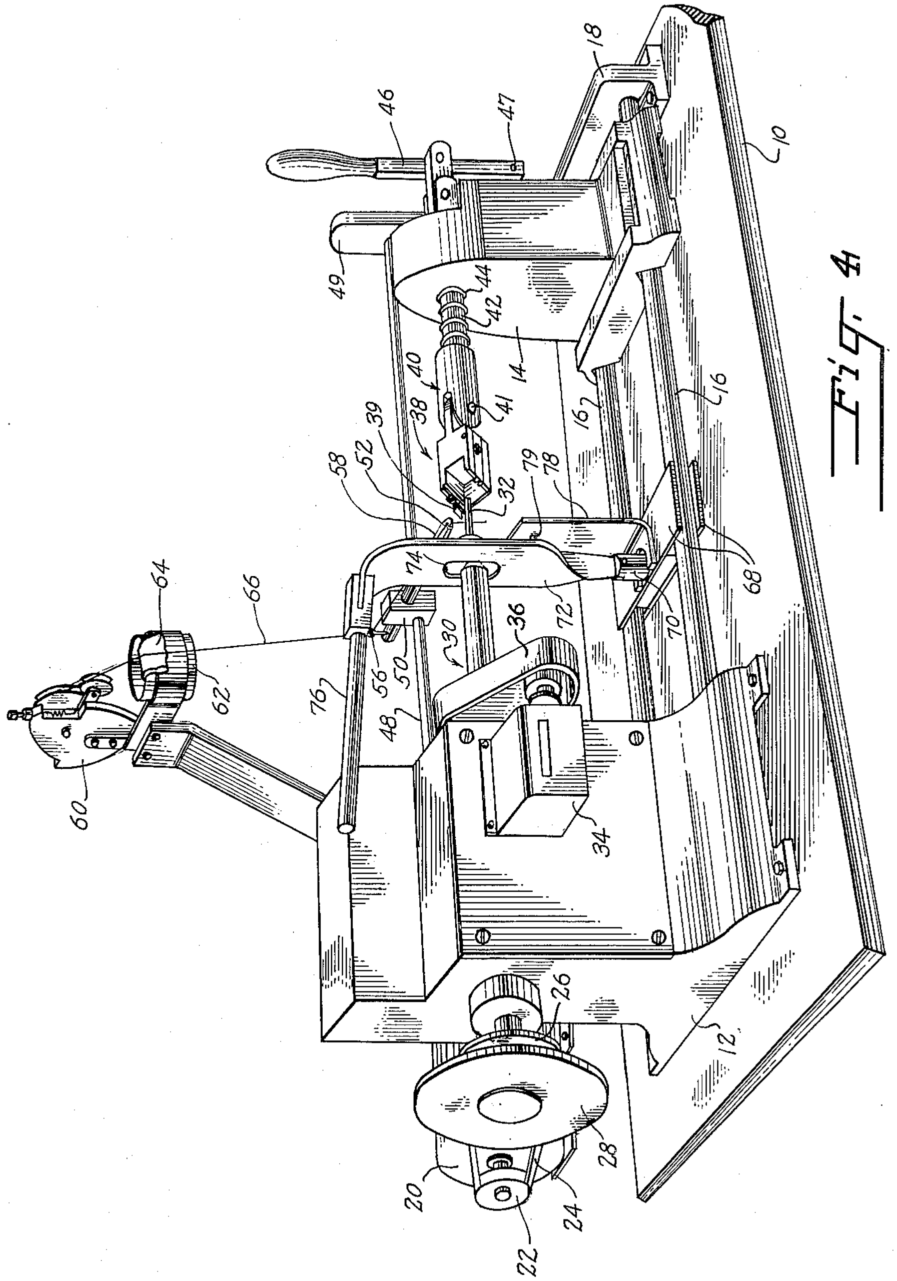
Figure 4 is a perspective view of apparatus for carrying out the novel mounting method.

The coil winding and mounting organization disclosed in Figure 4 comprises a bed plate 10 serving to support standards 12, 14, and 18. Two parallel rails 16 are supported between standards 12 and 18 to act as mounts for other appurtenances as will later be described. A motor 20 is carried by standard 12 and has a pulley 22 to drive belt 24 for transmitting power to pulley 26, close coupled with fly-wheel 28.

The spindle assembly driven from motor 20 is shown generally as reference character 30 and terminates in a divided end 32. A counter 34 carried by standard 12 is driven by a gear train (not shown) from the spindle shaft to terminate the winding cycle upon completion of a predetermined number of spindle turns. This feature is known in the art and is not material to the instant invention. Disposed in opposing relation to the spindle is a chuck plate or mounting plate receiver 38 pivotally carried in the bifurcated end of member 40, and having a knife 39 thereon for a purpose later to be explained. A shaft 42 supports member 40 and pierces standard 14 to extend from the other side and receive handle 46. The handle is pivoted at the bottom as at 47 whereby motion thereof in a plane parallel to the plane of the spindle causes translation of the member 40 away from the spindle. A heavy spring 44 is carried by shaft 42 and urges between member 40 and standard 14.

A shaft 48 is disposed parallel to spindle 30 and is carried for axial reciprocating translation between standard 12 and arm 49. A cam (not shown) driven by motor 20 causes the shaft to axially reciprocate at a frequency that is a function of the angular velocity of the spindle. Guide 58, mounted on shaft 48 by bearing block 50 has a small aperture piercing the distal end to pass the wire strand. As will be readily seen the guide serves to control the angle of approach of the strand to the spindle and the wire crosses over from edge to edge of the axial dimension of the coil at an angle of about 75–80 degrees to the coil axis as the guide reciprocates. The geometry of such a winding makes a self supporting coil. The path of travel of the strand about the periphery of the coil is a series of connected V's, the number of crossovers per turn being determined by the relation between spindle angular velocity and guide reciprocating frequency. This construction is known in the art and is well explained in a volume entitled "Coil Winding" published by the George Stevens Manufacturing Company, Chicago, Illinois.

Two parallel supporting plates 68 extend between rails 16 and carry thereon a boss 70. Pressure plate 72 is mounted for arcuate motion in boss 70 as will be best seen by reference to Figures 5 and 6, and has formed therein an aperture 74 to straddle the spindle. A handle 76 is secured to the end of the pressure plate. It will be of course understood that the manually operated handle may be replaced by a solenoid valve or any equivalent organization for imparting thrust to the pressure plate. A flanged member 78 is arranged adjacent to the plate and has an adjustable stop 79 acting to terminate motion of the pressure plate.

Figure 5:
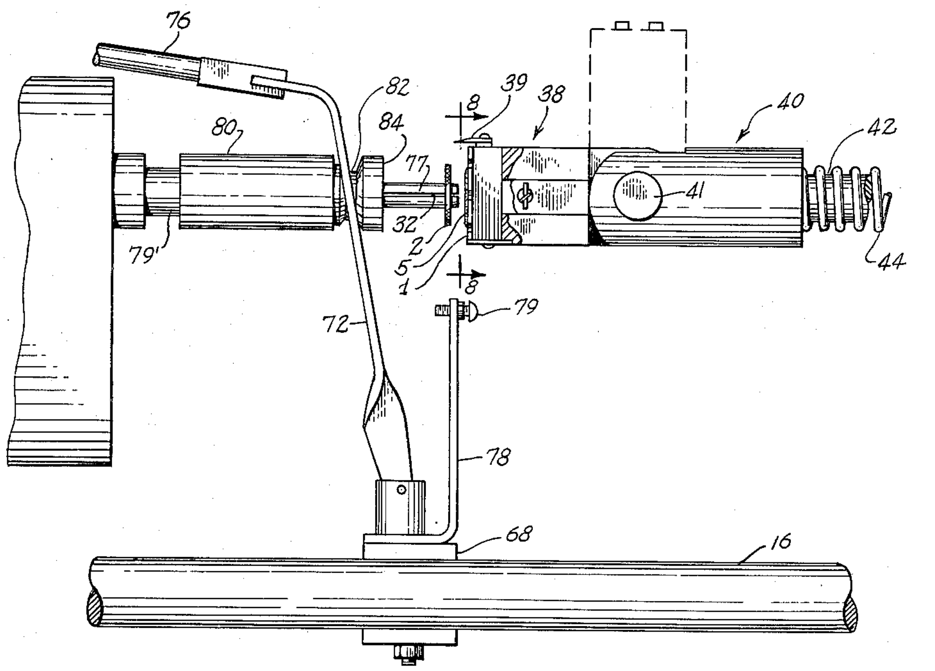
Figures 5 and 6 show elevations partly in section illustrating the operation of the apparatus in carrying out several of the method steps.
Figure 6:
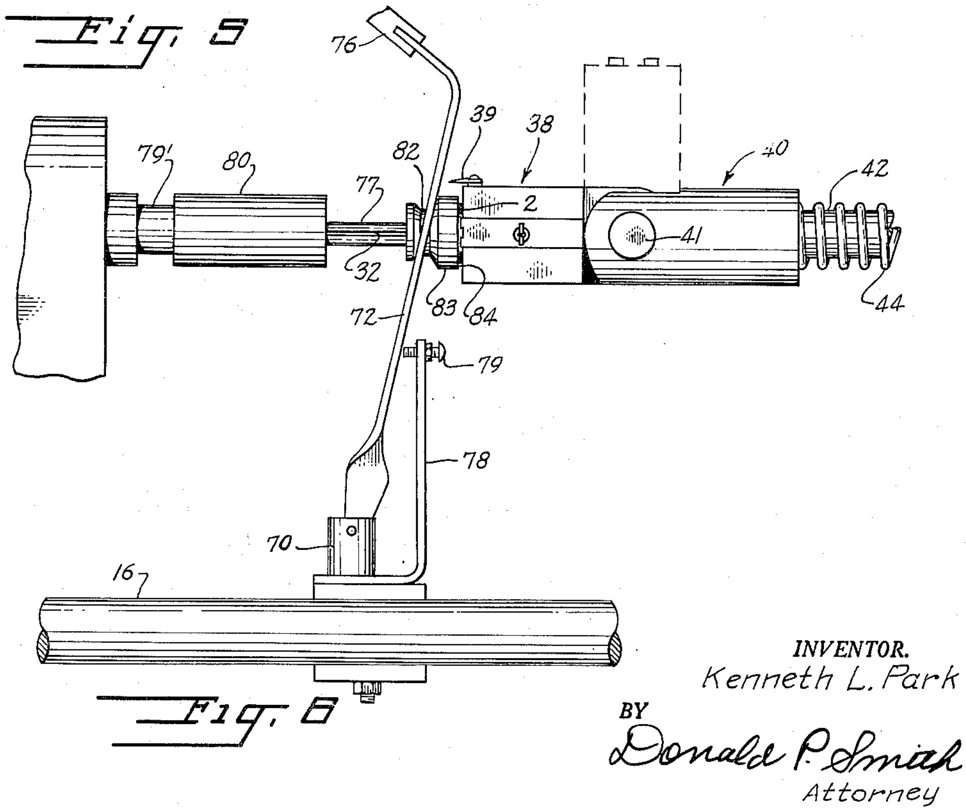
Figure 7:
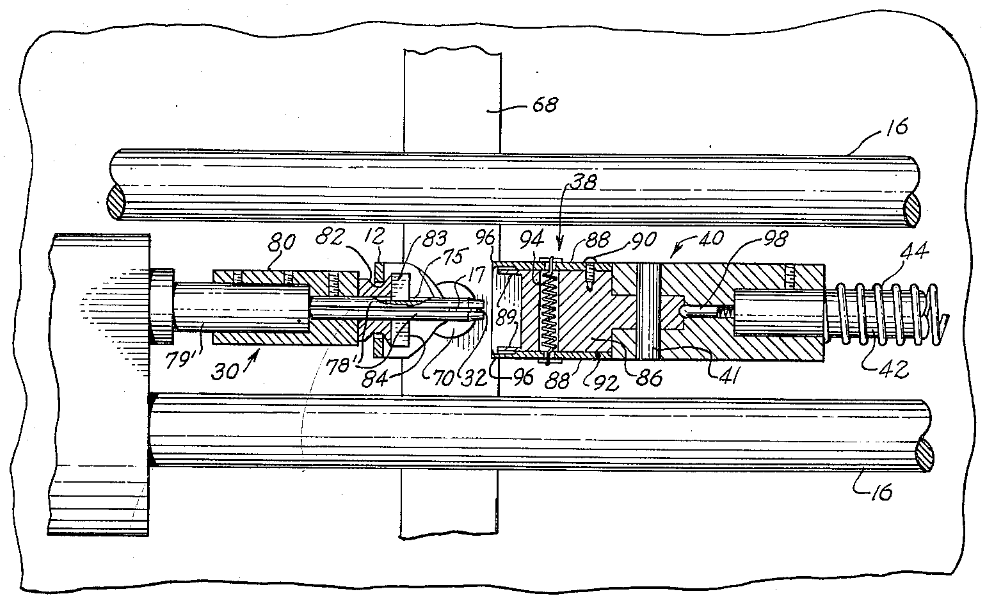
Figure 7 is a top plan view showing a detail of the structure illustrated in Figure 4 and partially in section.

Referring now to Figures 5, 6, and 7 it will be seen that the spindle has a portion of reduced diameter 79' with a sleeve 80 bolted thereto. A collar 83 is carried for rotation by the spindle and is constrained to be axially slidable thereon by a plurality of fingers 78' (Figure 7) received in longitudinal spindle channels 75. A trench 82 (Figures 5 and 6) is formed in the collar to act as a thrust bearing surface in cooperation with pressure plate 72 as will later more fully appear. The face 84 of the collar is machined to be smooth and to act as a coil engaging surface. The distal end of the spindle is divided as indicated by reference character 77 to receive the end of the wire strand when starting the winding act. The wire is fed from a maganize 60 (Figure 4) and caused to wipe over wick 64 immersed in a non-viscous adhesive in container 62 so as to apply an insulating and adhesive material to the wire in order to provide a fresh binding medium thereto and thereafter the wire passes through eyelet 56 to the aperture 58 at the end of the guide.

Figure 8:
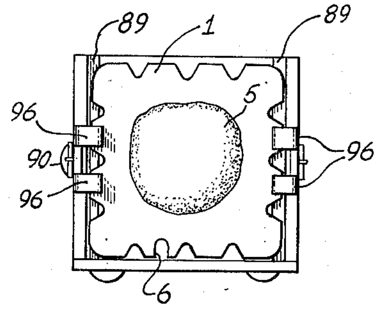
Figure 8 is a detail view taken on line 8—8 of Figure 5 and looking in the direction of the arrows.
Figure 9:
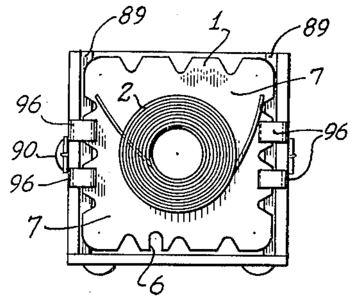
Figure 9 is a detail view showing the completed coil after the assembly step has been performed.

Figure 7 illustrates in detail the internal construction of plate receiver 38. A core 86 having outwardly flaring arms 89 is sandwiched between endwalls 88. One endwall is firmly affixed as by screw 90 and carries a first side of tension spring 94; the other endwall is pivotable about pin 92 and is held in core engaging relation by carrying the other end of the spring, substantially as shown. Fingers 96 extend laterally from the respective forward edges of the endwalls. A detent 98 is depended upon to yieldingly hold the plate receiver in either of two selected positions as will later be described. Figure 8 illustrates the plate receiver holding a plate 1 within the end wall fingers 96 and against arms 89; an area of adhesive 5 is ready to receive the coil. Figure 9 shows the coil mounted on the plate at the area of adhesive and ready for removal from the machine.

The operation of the device is as follows: The plate receiver is twisted as shown in the dotted outline positions of Figures 5 and 6 and a plate is inserted therein to be received in the manner disclosed in Figures 8 and 9. An area of adhesive 5 is applied to the plate by hand or by any of the known mechanical processes whereafter the receiver is rotated into the solid position shown, wherein the adhesive is aligned with the spindle and the plate is spaced therefrom. The magazine 60 holds a supply of wire which is constrained to pass wick 64 there to be coated with adhesive, penetrate eyelet 56 and pierced guide hole 52. It is thereafter passed through the divided spindle end 77 and the motor is started to initiate the winding operation. Motion of shaft 48 causing guide 58 to translate in a plane parallel to the plane of the spindle over a small path causes the coil to be wound in a true spiral but with the individual convolutions tracing cross-over path so that a general honeycomb coil is generated. After the required number of terms as determined by counter 34 the pressure plate handle 76 is urged to move in an arcuate path as is shown in Figures 5 and 6 causing collar face 84 to bear against the now completed coil 2. As the coil is moved off the spindle by the urging of the collar face it is pressed into contact with the plate held as previously described and the area of adhesive holds the coil against the plate. A knife edge 39 mounted on the receiver is pressed against by the wire strand during the motion of the coil from the spindle to the plate and strand is thereby severed. Spring 44 permitted limited motion of member 40 against the urging of the pressure plate and upon release thereof will return to its normal position. The coil is now removed by moving the receiver assembly slightly to the right to clear the spindle by pressure on handle 46 and twisting the plate receiver to the vertical position shown in dotted outline. The movable endwall 88 is pivoted to remove fingers 96 from interfering relationship with the plate, and the completed assembly is removed. The coil ends may now be soldered to the conductive risers and the plate assembled into modular form.

It will be understood that the invention envisions the coil mounting operation as applicable onto any structure and is not necessarily limited to the mounting of a coil on a plate of limited area. For example the plate receiver may be replaced by a simple holding device to present selected portions of a large planar member or chassis in succession to the spindle end to take coils.

While the invention is here illustrated and described with respect to certain preferred embodiments thereof many changes may be made without departing from the generic spirit and scope of the invention as set forth herein and in the claims appended hereto.

I claim:

1. A coil winding machine for forming coils from a continuous supply of wire and for mounting said coils upon a supporting plate, said machine comprising a standard; a spindle rotatably mounted on said standard and having securing means for receiving the end of said wire; a source of power rotating said spindle spirally to wind the wire about the axis of the spindle, a guide for the wire interposed between the wire supply and the wire securing means, driving means interconnecting the guide and the power source for imparting a reciprocating motion to the wire in a direction parallel to the axis of the spindle thereby to form a multi-layer spirally wound coil; a chuck plate for holding an adhesively coated supporting plate in coaxial relationship to the spindle, and means for relatively moving the chuck plate and the spindle in an axial direction to bring said plate into engagement with said wound coil for mounting said coil on said supporting plate.

2. A coil winding machine for forming coils from a continuous supply of wire and for mounting said coils upon a supporting plate, said machine comprising a standard; a spindle rotatably mounted on said standard and having securing means for receiving the end of said wire; a source of power rotating said spindle spirally to wind the wire about the axis of the spindle, a guide for the wire interposed between the wire supply and the wire securing means, adhesive coating means interposed between said wire supply and said wire securing means, driving means interconnecting the guide and the power source for imparting a reciprocating motion to the wire in a direction parallel to the axis of the spindle thereby to form a multi-layer spirally wound adhesively bound coil; a chuck plate for holding said supporting plate in coaxial relationship to the spindle, and means for relatively moving the chuck plate and the spindle in an axial direction to bring said plate into engagement with said wound coil for mounting said coil on said supporting plate.

3. A coil winding machine for forming coils from a continuous supply of wire and for mounting said coils upon a supporting plate, said machine comprising a standard; a spindle rotatably mounted on said standard and having securing means for receiving the end of said wire; a source of power rotating said spindle spirally to wind the wire about the axis of the spindle, a guide for the wire interposed between the wire supply and the wire securing means, adhesive coating means interposed between said wire supply and said wire securing means, driving means interconnecting the guide and the power source for imparting a reciprocating motion to the wire in a direction parallel to the axis of the spindle thereby to form a multi-layer spirally wound coil; a chuck plate for holding a supporting plate in coaxial relationship to the spindle, and a collar slidably mounted on said spindle for relatively moving the wound coil axially along said spindle into engagement with said chuck plate for mounting said coil on said supporting plate.

4. A coil winding machine for forming coils from a continuous supply of wire and for mounting said coils upon a supporting plate, said machine comprising a standard; a spindle rotatably mounted on said standard and having securing means for receiving the end of said wire; a source of power rotating said spindle spirally to wind the wire about the axis of the spindle, a guide for the wire interposed between the wire supply and the wire securing means, driving means interconnecting the guide and the power source for imparting a reciprocating motion to the wire in a direction parallel to the axis of the spindle thereby to form a multi-layer spirally wound coil; a chuck plate for holding an adhesively coated supporting plate in coaxial relationship to the spindle, a collar slidably mounted on said spindle for relatively moving the wound coil along the spindle in an axial direction to bring said plate into engagement with said wound coil for mounting said coil on said supporting plate, and means for moving said chuck plate axially away from said spindle.

5. A coil winding machine for forming coils from a continuous source of wire and for mounting said coils upon a supporting plate, said machine comprising a standard; a spindle rotatably mounted on said standard and having securing means for receiving the end of said wire; a source of power rotating said spindle spirally to wind the wire about the axis of the spindle, a guide for the wire interposed between the wire supply and the wire securing means, adhesive coating means interposed between said wire supply and said securing means, driving means interconnecting the guide and the power source for imparting a reciprocating motion to the wire in a direction parallel to the axis of the spindle thereby to form a multi-layer spirally wound coil; a chuck plate for holding an adhesively coated supporting plate in coaxial relationship to the spindle, a collar slidably mounted on said spindle for relatively moving the wound coil axially along said spindle into engagement with said chuck plate for mounting said coil on said supporting plate, means for moving said chuck plate and said supporting plate axially away from said spindle, and wire cutting means mounted on said chuck plate for cutting said wound coil from said wire source as said chuck plate is moved away from said spindle.

6. A coil winding machine for forming coils from a continuous source of wire and for mounting said coils upon a supporting plate, said machine comprising a standard; a spindle rotatably mounted on said standard and having securing means for receiving the end of said wire; a source of power rotating said spindle spirally to wind the wire about the axis of the spindle, counting means for stopping said spindle after a predetermined number of turns of said spindle, a guide for the wire interposed between the wire supply and the wire securing means, adhesive coating means interposed between said wire supply and said securing means, driving means interconnecting the guide and the power source for imparting a reciprocating motion to the wire in a direction parallel to the axis of the spindle thereby to form a multi-layer spirally wound coil; a chuck plate for holding an adhesively coated supporting plate in coaxial relationship to the spindle, a collar slidably mounted on said spindle for relatively moving the wound coil axially along said spindle into engagement with said chuck plate for mounting said coil on said supporting plate, means for moving said chuck plate and said supporting plate axially away from said spindle, and wire cutting means mounted on said chuck plate for cutting said wound coil from said wire source as said chuck plate is moved away from said spindle.

References Cited in the file of this patent

UNITED STATES PATENTS

| | | |
|---|---|---|
| 1,828,413 | Holmes | Oct. 20, 1931 |
| 2,177,260 | Laube | Oct. 24, 1939 |
| 2,277,826 | Giroux | Mar. 31, 1942 |
| 2,282,759 | Gavitt | May 12, 1942 |
| 2,379,666 | Swartz et al. | July 3, 1945 |
| 2,406,130 | Boyce | Aug. 20, 1946 |
| 2,426,090 | Gartner | Aug. 19, 1947 |
| 2,481,314 | Knauf | Sept. 6, 1949 |
| 2,511,897 | Booth | June 20, 1950 |
| 2,515,486 | Bertalan | July 18, 1950 |
| 2,523,506 | Richard | Dec. 12, 1950 |
| 2,537,457 | Gref | Jan. 9, 1951 |
| 2,557,932 | Baymiller | June 26, 1951 |
| 2,631,788 | Cerasani | Mar. 17, 1953 |
| 2,774,014 | Henry | Dec. 11, 1956 |